United States Patent [19]

Sparkes

[11] Patent Number: 4,697,969
[45] Date of Patent: Oct. 6, 1987

[54] WOOD SCREW

[76] Inventor: Wilford S. Sparkes, 5543-A Marshwood La., Murray, Utah 84107

[21] Appl. No.: 773,112
[22] Filed: Sep. 6, 1985
[51] Int. Cl.⁴ ............................................. F16B 25/00
[52] U.S. Cl. .................................. 411/387; 411/399; 411/421
[58] Field of Search ............... 411/386, 387, 399, 421, 411/420, 418, 417; 408/230

[56] References Cited

U.S. PATENT DOCUMENTS

| 45,133 | 11/1864 | Bonwill | 411/421 |
| 877,131 | 1/1908 | Searelle | 411/399 |
| 1,235,626 | 8/1917 | Woodward | 411/421 |
| 3,136,205 | 6/1964 | Ansingh | 411/387 |
| 3,370,501 | 2/1968 | Ansingh | 411/387 |

FOREIGN PATENT DOCUMENTS 125131  11/1984  European Pat. Off. ............ 411/387

*Primary Examiner*—Neill Wilson
*Attorney, Agent, or Firm*—Edgar W. Averill, Jr.

[57] ABSTRACT

An improved wood screw which is self drilling. The wood screw has a first spiral flute that extends essentially the full length of the screw. The screw also has a second spiral flute which begins at the point of the screw and which terminates a short distance from the point.

10 Claims, 8 Drawing Figures

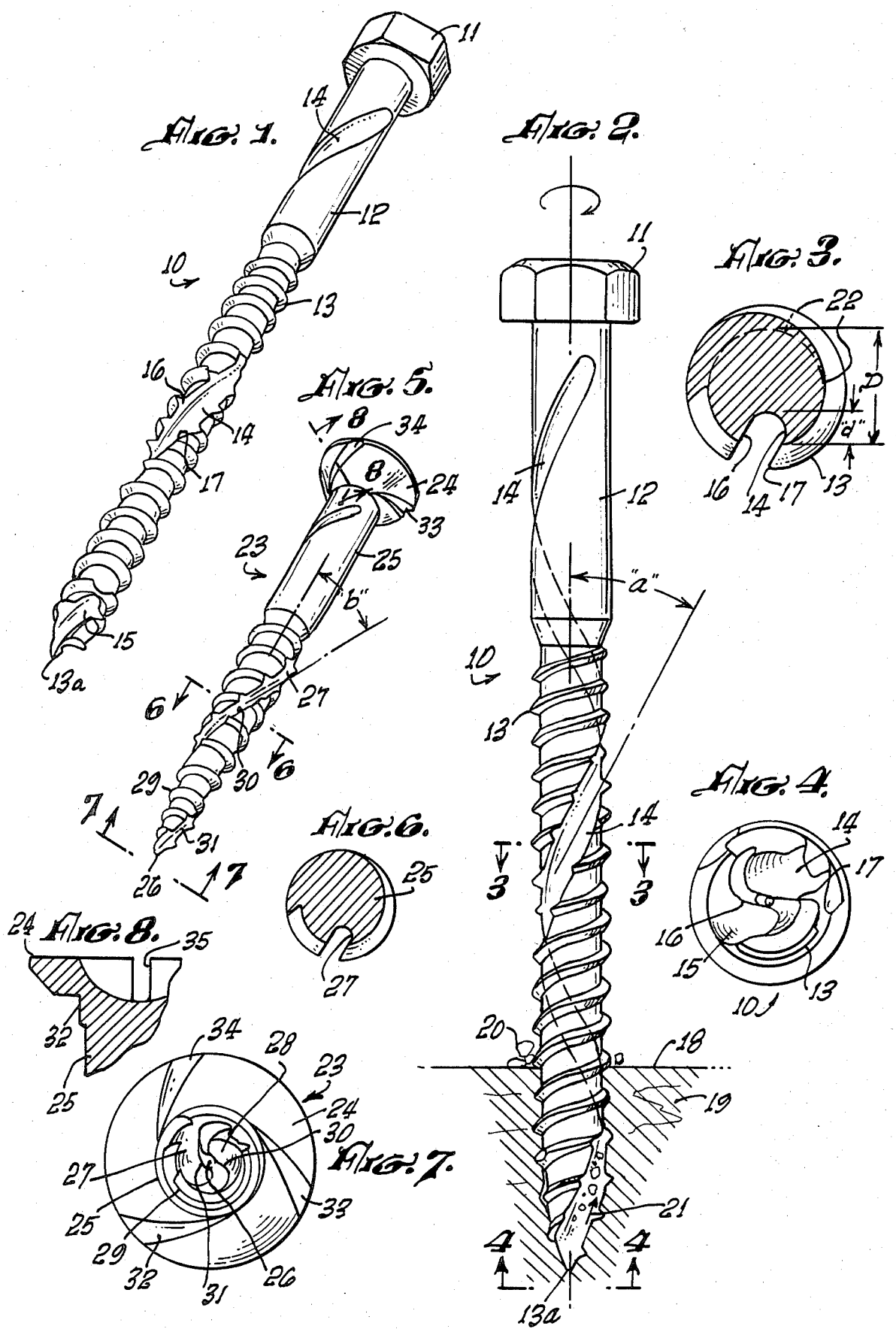

WOOD SCREW

BACKGROUND OF THE INVENTION

The field of the invention is wood screws and the invention relates more particularly to wood screws of the type which do not need to have a pilot hole drilled therefor.

Numerous attempts have been made over the years to facilitate the fastening of wooden objects. A novelty search revealed the suggestion of the addition of a spiral flute at a very early time. Such concept is shown in the U.S. Pat. Nos. 45,133, 142,112, 877,131 and 1,235,626. In spite of these early attempts, such screws have not found widespread use although the need for eliminating the time and inconvenience of drilling a pilot hole persists.

It is well known that simply driving a wood screw into wood without the provision of a pilot hole, particularly in hardwood, almost invariably results in the splitting of the wood. It also is very difficult to start the wood screw in a straight line.

SUMMARY OF THE INVENTION

It is, thus, an object of the present invention to provide a wood screw which does not require a pilot hole and which is easily started and continued into the wood.

The present invention is for an improved wood screw of the type having a head, a shank and threads having exceptionally easy starting and insertion ability. The screw has a first spiral flute passing essentially the full length of the screw. A second spiral flute begins at the point of the screw but continues only a short distance therefrom. The shape of the second spiral at the tip is about the same shape as the first spiral at the tip, so that the tip is symmetrical, starts immediately and does not tend to wander when started. Preferably, the screw also has cutting means along the undersurface of the head of the screw so that it is also self countersinking.

BRIEF DESCRIPTION OF THE DRAWINGS

FIG. 1 is a perspective view of a wood screw of the present invention.

FIG. 2 is a side view of the screw of FIG. 1 started in a block of wood.

FIG. 3 is an enlarged cross-sectional view taken along line 3—3 of FIG. 2.

FIG. 4 is an enlarged end view taken along line 4—4 of FIG. 2.

FIG. 5 is a perspective view of a flat head screw of the present invention.

FIG. 6 is an enlarged cross-sectional view taken along line 6—6 of FIG. 5.

FIG. 7 is an enlarged end view taken along line 7—7 of FIG. 5.

FIG. 8 is an enlarged cross-sectional view taken along line 8—8 of FIG. 5.

DESCRIPTION OF THE PREFERRED EMBODIMENTS

A wood screw which is self drilling is shown in FIG. 1 and indicated generally by reference character 10. Wood screw 10 is of the type generally referred to as a lag bolt and has a hexagonal head 11, a shank 12, a spiral thread 13 and a root 22 at the base of the thread. The point of the screw 13a has a drilling surface formed therein shown best in FIG. 4. The drilling surface is created by a first spiral flute 14 which extends essentially the full length of the screw and a second short flute 15 which extends only a short distance from the tip. The point 13a is, thus, shaped very much like a common drill having a pair of flutes and a pair of cutting edges which might be referred to as edges 16 and 17 in FIG. 4. Because of this, when the screw is placed on a surface of wood such as surface 18 of wood block 19, wood screw 10 readily drills a pilot hole for itself, and the wood cuttings 20 are conveyed upwardly as indicated by arrow 21 in FIG. 2.

The shape of the spiral flute 14 is shown in FIG. 3. There the cross-sectional shape of flute 14 can be seen to be approximately one semicircle with respect to the root 22. The depth "d" of flute 14 is approximately one-third of the diameter "D" of root 22. The depth of flute 14 should not be such that it significantly weakens the strength of screw 10, while it should be sufficiently deep so that it is capable of conveying the wood cuttings to the surface of the wood. A distance of about one-third of the root depth has been found appropriate for this purpose.

The angle of the spiral with respect to the longitudinal axis of lag screw 10 is indicated by angle "a" in FIG. 2. This angle should be about thirty degrees to properly convey the wood cuttings from the pilot hole drilled by the screw, itself. The angle should not be so great as to tend to drive the wood screw into the wood, but a certain amount of spiral is appropriate to assist in conveying the wood cuttings upwardly.

A flat headed screw is shown in FIG. 5 and indicated by reference character 23. Screw 23 has a flat head 24, a shank 25, a point 26 and a spiral flute 27 which extends essentially the full length of the screw. A second flute 28 begins at point 26 and extends through about three thread crests such as thread crest 29. The two flutes are shown in FIG. 7 and, again, it can be seen that point 26 is symmetrical and has a pair of cutting edges 30 and 31.

Screw 23 has a second feature which facilitates counter-sinking head 24 to a point where it is even with the wood surface. This comprises a plurality of cutting grooves 32, 33 and 34. Groove 34 is shown in cross-sectional view in FIG. 8 and serves to cut into the wood and to spread the wood cuttings outwardly as the screw is turned.

The angle of spiral flute 27 is indicated by "b" in FIG. 5 and once again is approximately thirty degrees with respect to the longitudinal axis of flat head screw 23.

It has been found beneficial to utilize a phillips head type of head because of its tendency to hold the screwdriver point along the axial center of the screw. It has also been found beneficial to utilize power tools to drive a hex head screw such as wood screw 10, and this also tends to hold the screw in a vertical desired orientation.

The resulting wood screw of the present invention may be made in various sizes and for various purposes. The wood cuttings in the long spiral tend to be compressed and create an exceptionally strong fastening quality of the screw in the wood. The spiral flute through the threads act as a tap, cutting clean threads in the wood rather than compressing and splitting or weakening the material. It has been found that wood screws made according to the present invention will penetrate through knots while reducing the danger of splitting the wood, even near the ends of the material. The shape of the point of the screw removes just enough wood to allow the screw to be started without creating the wedge effect of a normal wood screw. By not having to drill a pilot hole, labor is saved, and in many locations it is difficult to bring a drill to the work site and, thus, this step is also eliminated. The principle of the present invention applies not only to small wood screws, but also to large lag bolts as shown in the drawings.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

What is claimed is:

1. An improved wood screw of the type having a head, a shank, a root, a point and threads spiralled about the root, said screw having exceptionally easy starting and insertion of the screw in wood wherein the improvement comprises:
   a first spiral flute beginning at the point of the screw and passing essentially the full length of the screw; and
   a second spiral flute beginning at the point of the screw and terminating a short distance from the tip and having about the same shape at the point as the first spiral flute so that the tip is symmetrical about a bisector whereby the tip of the flute acts as a drill point retaining partial threads, and the first spiral flute carries wood dust out of the hole which is drilled by the turning of the screw.

2. The improved wood screw of claim 1 wherein said first spiral flute is generally semi-circular with respect to the root of said screw when viewed in cross-section.

3. The improved wood screw of claim 2 wherein the depth of said generally semi-circular flute is about one-third of the diameter of the root.

4. The improved wood screw of claim 1 wherein a tangent to the central axis of said first spiral forms an angle of about thirty degrees with respect to the central axis of the screw.

5. The improved wood screw of claim 1 wherein said screw is a flat head screw.

6. The improved wood screw of claim 5 further including a plurality of cutting surfaces formed by indentations formed on the base of the head.

7. The improved wood screw of claim 6 wherein there are three such indentations.

8. The improved wood screw of claim 1 wherein said screw is a hex head screw.

9. The improved wood screw of claim 1 wherein said second spiral flute extends toward the head a distance of about three threads.

10. The improved wood screw of claim 1 wherein said screw is a phillips head screw.

* * * * *